May 4, 1937.  G. D. GILLETT  2,079,205

APPARATUS AND METHOD FOR DETERMINING FIELD STRENGTH

Filed March 2, 1935

INVENTOR.
G. D. Gillett
BY James P. Burns
ATTORNEY.

Patented May 4, 1937

2,079,205

UNITED STATES PATENT OFFICE 2,079,205

APPARATUS AND METHOD FOR DETERMINING FIELD STRENGTH

Glenn D. Gillett, Englewood, N. J.

Application March 2, 1935, Serial No. 9,113

13 Claims. (Cl. 250—1)

This invention relates to a method and apparatus for determining the field strength of radio transmitters and apparatus for measuring the field strength of transmitting stations operating upon substantially the same frequency under operating conditions and at any desired point in the field of said stations.

The invention is particularly useful in making surveys of the field of transmitting stations. Such surveys are usually made to determine the amount of interference existing between stations operating upon substantially the same frequency. There is no receiving set available with sufficient selectivity to separate the carriers with even the fifty cycle plus or minus frequency difference allowed by the Federal Radio Commission so as to permit independent measurements of the field strengths of the stations. Heretofore it has been necessary to either shut down one station during normal operating hours or to operate one station at other than the normal operating times. The first alternative is not usually practicable, and correct readings for normal operation are not obtained by the latter.

The present invention makes it possible to make accurate surveys while both stations are operating and during normal operating times.

It is, therefore, an object of the invention to provide a novel method for making radio field strength determinations.

Another object of the invention resides in the provision of a method of and system for making determinations of the field strength of a radio transmitter within the field of a second transmitter operating upon substantially the same frequency.

Another object is to provide a method of making determinations of the field of a distant station in the vicinity of a local station operating upon substantially the same frequency.

Another object is to provide a method of and system for making such field strength determinations in which static interference is substantially eliminated.

Another object resides in the provision of a simple and inexpensive apparatus for making determinations of the field strength of radio transmitters.

Another object of the invention is to provide an apparatus or system for determining the strengths of the fields of two radio transmitters operating upon substantially the same frequency at any point within such fields.

A further object is to provide an apparatus for determining the field strength of a distant station at any point in the vicinity of a local station operating upon substantially the same frequency and which also substantially eliminates errors due to atmospheric and other interference.

A still further object is to provide a method and apparatus or system for determining the individual field strengths of two radio transmitters having overlapping fields at any point within the two fields irrespective of whether or not the carriers of either or both stations are modulated.

The method of making field strength determinations in accordance with this invention comprises, broadly, slightly changing the frequency of one of the transmitting stations within a predetermined range, such as the range permitted by the Federal Radio Commission, and then measuring the amplitude of the audio beat note thereby produced as well as the total field intensity of both stations at a particular point within their fields. The method of making such determinations will be more completely described in connection with the operation of the system and field strength determining apparatus shown in the attached drawing, of which:

Figure 1:
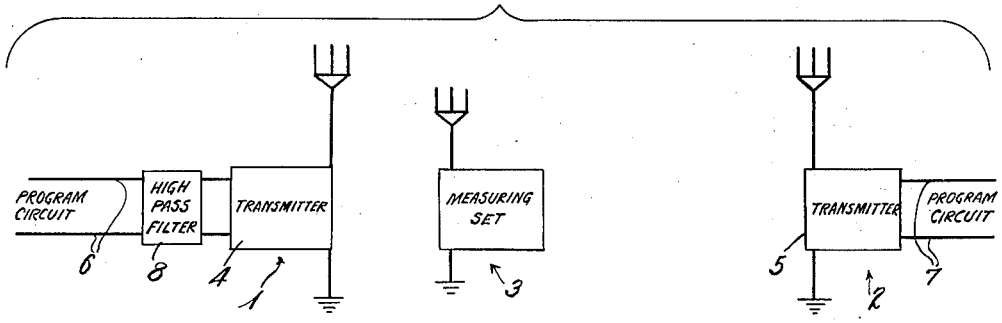
Figure 1 is a diagrammatic drawing showing the manner in which the method is performed.

Referring more particularly to the drawing, 1 indicates a local radio transmitting station, 2 indicates a distant transmitting station, and 3 indicates the field strength determining apparatus shown as being positioned nearer the transmitting station 1 than transmitting station 2. The transmitting stations 1 and 2 are in general standard transmitting stations operating upon the same frequency and having overlapping fields. They comprise transmitters 4 and 5 having the usual high frequency and modulating circuits, the details of which are not shown. Program circuits 6 and 7 leading from microphones, audio amplifiers, or audio transmission lines (all not shown) are connected to the transmitters 4 and 5, respectively. If the audio signal impressed upon the carriers of either transmitter, particularly the local transmitter 4, contains appreciable power at frequencies below approximately 60 cycles, it may be necessary to connect a high pass filter 8 in the program circuit 6 to prevent such low frequencies being impressed upon the carrier radiated by the transmitter 4 for a purpose which will hereinafter appear.

Figure 2:
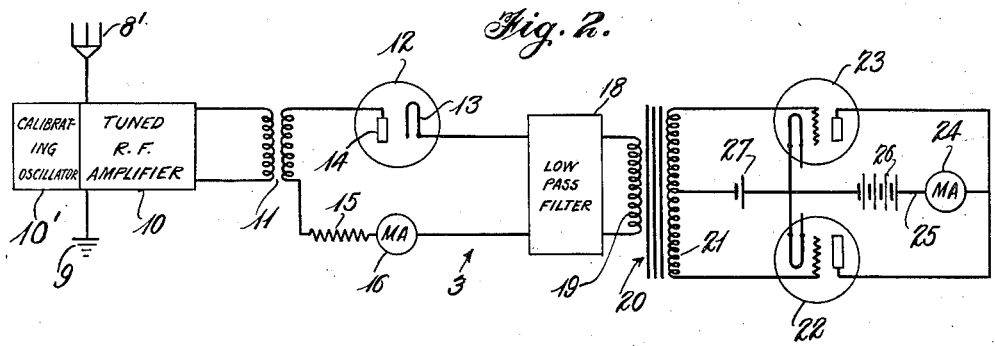
Figure 2 is a schematic drawing of the essential circuits of one form of field strength determining device.

The field strength determining apparatus 3 is shown in more detail in Figure 2 and includes the usual antenna circuit including the antenna 8' and ground 9 feeding a tuned radio frequency amplifier or equivalent device indicated diagrammatically at 10. The details thereof are not shown and it suffices to say that the amplifier 10 may be of any well-known type, such as neutrodyne, screen grid, or superheterodyne, which can be relatively sharply tuned to the frequency of the stations being surveyed, or it may be merely a filter system for passing the required frequency. A calibrating oscillator for generating a local frequency is shown it 10' for impressing a controllable radio frequency upon the amplifier 10. This oscillator should be adjustable to change its frequency and output and should be provided with dials indicating its frequency and output. Such oscillators are well-known in the art, and it is not believed necessary to further describe the details thereof.

The amplifier 10 is coupled by a radio frequency transformer 11 to a detector or rectifying circuit which includes a two-electrode low-voltage rectifying tube 12 having a hot cathode 13 and a cold anode 14. For clearness in the drawing, the filament or heating circuits are omitted. The anode 14 is connected to one terminal of the secondary of the transformer 11, which has its other terminal connected through a resistance 15 and a milliammeter 16 to the input of a low-pass filter 18. The cathode 13 of the tube 12 is also connected to the input of the low-pass filter 18, which has its output connected to the primary 19 of an audio transformer 20. The low-pass filter, the details of which will be apparent to those skilled in the art, is designed to cut off sharply all frequencies above approximately 50 cycles. The reading of the meter 16 will be a function of the sum of the field strengths of the two stations, and its reading may be translated into field strengths by noting the output of the calibrating oscillator at the same frequency which gives the same meter reading. The low-pass filter 18 and the transformer 20 are constructed to substantially uniformly pass frequencies below 50 cycles, especially frequencies between 3 and 40 cycles, such as a beat note produced by operating the transmitting stations 1 and 2 with a frequency difference within this range.

The center tapped secondary 21 of the audio transformer feeds a push-pull circuit shown as comprising two three-electrode tubes 22 and 23 having their grids connected to the end terminals of the secondary 21. The plates of these tubes are connected together, and a milliammeter 24, capable of indicating direct currents, is connected in the common return 25 for the plate circuit. The audio circuit is provided with the usual plate and biasing potential shown as batteries 26 and 27, respectively. By selecting the bias potential to be applied to the grids of tubes 22 and 23, this circuit may be made to function as a detector so that the direct current through the meter 25 will be varied when the beat note is impressed upon the grids. The reading of the meter 24 will be some function of the product of the field strengths of the two stations.

Figure 3:
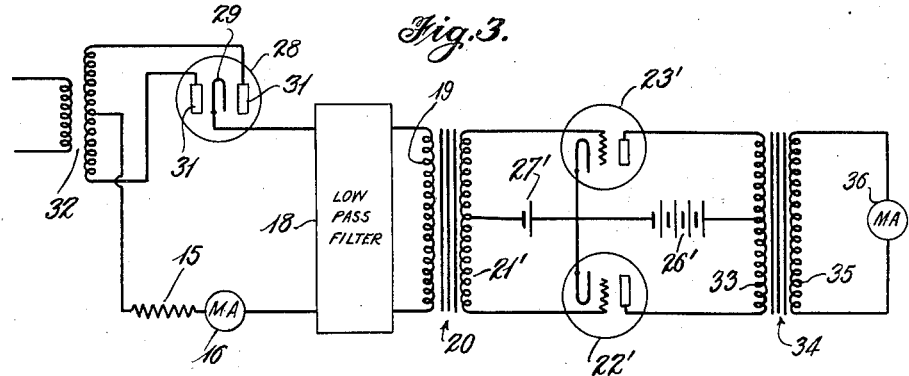
Figure 3 is a schematic drawing showing a modification of the device shown in Figure 2.

A modification of the rectifying and audio amplifying circuits is shown in Figure 3. In this modification a three-electrode rectifying tube 28 is used having a hot cathode 29 and two anodes 30 and 31 for full-wave rectification. The anodes are connected to the end terminals of a center tapped secondary of a radio frequency transformer 32 coupling the tube to the amplifier 10 of Figure 2. The other elements of the rectifying circuit are the same as those in the corresponding circuit of Figure 2 except that the resistance 15 is connected to the center tap of the secondary of transformer 32. The push-pull circuit, including the secondary 21', tubes 22' and 23', and sources of potential 26' and 27', is in this case biased for audio frequency amplification, and the plates of the tubes 22 and 23 are connected to the end terminals of a center tapped primary 33 of an audio transformer 34, the secondary 35 of which is connected in series with an alternating current meter 36.

In operation the field strength determining apparatus is positioned within the fields of two transmitting stations normally operating upon the same frequency. Usually the apparatus is much nearer one of the stations than the other since ordinarily the survey is instituted to determine the extent to which the field of a distant station interferes with that of a local station, although the invention is not limited to such an operation. The Federal Radio Commission rules require that the carrier frequency of radio stations be kept within 50 cycles plus or minus, but in practice the carrier frequency is ordinarily held within 1 or 2 cycles of that assigned. In the practice of this invention, the frequency of one of the stations, usually the local station, is set from 3 to 40 cycles off the assigned frequency, but well within the permissible tolerance. This will result in a frequency difference of 3 or 40 cycles between the two station carriers which, whenever an appreciable signal is received from both stations, will produce a beat note of this frequency in every receiver tuned to the two stations. However, this beat note will not be noticeable in the ordinary broadcast receiver since the vast majority of such receivers have their audio frequency amplifiers and loud speaker systems designed so as to not reproduce a frequency of 60 cycles or below. It will not, therefore, cause appreciably more interference to reception than the ordinarily produced beat note of 2 or 3 cycles per second, and it is frequently found that one or both of the stations are operating far enough off their assigned frequency to produce the required beat note.

The radio frequency amplifier 10 of the field strength determining apparatus is then tuned as nearly as possible to the frequency of the two stations and the meter readings 16 and 24 taken. The signal from both stations is amplified at radio frequency by the amplifier 10 and fed to the rectifying circuit by the transformer 11 where the radio frequency is rectified so as to give a uni-directional current through the meter 16. The signal from the transmitting stations is then removed and the meter reading calibrated by the calibrating oscillator by impressing a signal locally generated by the oscillator of the same frequency as that of the stations being surveyed and adjusting the oscillator to produce the same deflection of meter 16 as that produced by the signals from the transmitting stations. The intensity of the signal necessary to produce this deflection can then be determined from the oscillator. If desired, the meter 16 may be damped to give an average reading even though the carriers are modulated, or a reading of the average deflection may be taken. This average deflection of meter 16 may be some function of the resultant of the field strengths of the two stations without appreciable error. That is, $M_1 = F(f_1+f_2)$ where $M_1$ is the deflection of meter 16, $f_1$ is the field strength of station 1, and $f_2$ the field strength of station 2. If the apparatus is positioned close to the local station and the signals from the distant station are comparatively weak, the deflection of meter 16 can be taken as a measure of the field of the local station without appreciable error, and it is further noted that this portion of the apparatus may be employed to measure the field strength of a single station when no other station operating upon substantially the same frequency has its field influencing the apparatus.

The rectified current flowing in the rectifier circuit has present therein an audio frequency component containing all of the audio frequencies of the modulated carriers which are able to pass through the sharply tuned amplifier 10 and in addition the beat frequency of the two carriers, namely, a beat note of 3 to 40 cycles, depending upon the frequency difference between these carriers. All audio frequencies above approximately 50 cycles are prevented from reaching the primary 19 of the transformer 20 by the low-pass filter 18. In general, carriers from transmitting stations are not modulated appreciably at frequencies below 50 cycles, and the current through the primary 19 will represent only the beat note. However, if either of the two station carriers is so modulated, particularly the local station, it may be desirable to connect a high-pass filter 8 in the program circuit thereof so as to prevent all frequencies below approximately 60 cycles from reaching the modulator. The beat note is detected by the push-pull circuit including the tubes 22 and 23 and the D. C. component in the conductor 25 indicated by the meter 24 of Figure 2, or the beat note may be amplified by the circuit including the tubes 22' and 23' and the A. C. component indicated by meter 36 of Figure 3. The deflection of these meters will be some function of the product of the field intensities of the two stations. That is, $M_2 = \phi(f_1 \times f_2)$ where $M_2$ is the deflection of meter 24.

The apparatus may be calibrated in fields of known strength and the meter 24 graduated to give direct readings of the product of the field strengths, which is in fact a measure of the relative interference, in any units desired or suitable tables or calibration curves prepared. It has been found convenient in field work to calibrate this meter in terms of percentage of interference received by the local station from the distant station. Knowing the field strength of the local station and the product of the field strengths, the respective field strengths can be easily calculated.

Since only the carrier frequencies which have a frequency difference of only 3 to 40 cycles are necessary to be received, it is possible to eliminate most of the interference due to atmospherics or other stray fields since such fields ordinarily cover a wide range of audio frequencies and represent a very small amount of power within a narrow frequency band. The low-pass filter 18 cuts off all audio frequencies above approximately 50 cycles and thus prevents higher audio frequencies carried by stray fields from influencing the audio amplifying or detecting circuit and associated meter. It is to be noted that in cases where interference is serious, the meters 24 or 36 may be used to determine the field strength of a single station by supplying a local frequency of known strength from the calibrating oscillator to produce a low frequency beat note.

It is evident that the field strength determining apparatus may be made a mobile unit and may be mounted upon a vehicle for movement from point to point within the fields of the stations being surveyed. It is also evident that the meters 16, 24, or 36 might be made direct reading in terms of field strength and the calibrating oscillator eliminated as part of the mobile unit, but because of possible instability of the radio frequency amplifier or filter or the rectifying circuit, it is preferred to employ the calibrating oscillator for each determination. If desired, the meters 16 and 24 or 36 may be of the continuously recording type so that a permanent record of their deflection is obtained. It is understood that other changes may be made as to the details of the apparatus; for example, other types of detecting, rectifying, and amplifying circuits may be employed and other details varied within the scope of the following claims.

I claim:

1. The method of making field strength determinations of two radio stations normally operating simultaneously upon substantially the same frequency and having overlapping fields which comprises operating said stations upon slightly different carrier frequencies, receiving and detecting the carrier frequencies from both stations thereby producing an audio frequency beat-note, determining the resultant of the field strengths of both stations, and determining the field strength of the weaker station by measuring the amplitude of the beat-note only caused by the frequency difference of the stations.

2. The method of making field strength determinations of two radio stations normally operating upon substantially the same frequency and having overlapping fields while the carriers from said stations are modulated, which comprises operating said stations upon slightly different frequencies whereby to produce an audio beat-note frequency when said slightly different frequencies are combined in a detector, preventing modulation of said carriers at audio frequencies of the order of the beat-note frequency, rectifying said carrier frequencies received and determining the resultant of their intensities, and filtering out the beat-note resulting from the rectification of said carriers differing slightly in frequency and determining its amplitude.

3. The method of determining the field strength of a distant station normally operating simultaneously upon the same frequency of a local station, at a point in the vicinity of said local station, which comprises slightly changing the frequency of one of said stations, receiving and amplifying the carrier frequencies of both stations, detecting said carrier frequencies, measuring the unidirectional current thereby produced and calibrating this current in terms of the combined field strength being received at said point, filtering out the beat note produced by the frequency difference of said stations, and measuring the amplitude of the alternating current representing said beat note only.

4. A system for determining the field strengths of two stations operating simultaneously at a frequency difference of less than 100 cycles, at a point within the fields from both stations, which comprises a tuned radio frequency amplifier for receiving and amplifying the signals from both stations, a rectifying circuit for rectifying currents resulting from said frequencies, means for measuring the resulting uni-directional current, means for calibrating said uni-directional current in terms of the combined field strength being received at said point, an audio amplifying circuit for separating and amplifying the beat note component of said rectified current caused by the frequency difference of said stations, and means for measuring said amplified beat note current only.

5. A system for determining the field strengths of two stations operating simultaneously at a frequency difference of less than 100 cycles, at a point within the fields from both stations, which comprises a tuned radio frequency amplifier for receiving and amplifying the signals from both stations, a detector circuit coupled to said amplifier for rectifying said amplified signals, means for measuring the intensity of said rectified signals, an audio circuit for separating the beat note, resulting from the frequency difference of said stations, from said rectified signal, and means for measuring the intensity of said beat note only.

6. A system for determining the field intensity of a distant station in the vicinity of a local modulated station when said stations are operating with a slight frequency difference which comprises means for combining the frequencies from the distant station and the local station in a detector to produce an audio beat-note frequency, means for measuring the field intensity of the local station, and means for measuring the intensity of the beat-note only produced by said frequency difference as a mathematical function of said field intensity of the local station.

7. A system for determining the field intensity of a distant station in the vicinity of a local modulated station when said stations are operating with a frequency difference of 3 to 40 cycles, which comprises means for combining the frequencies from the distant station and the local station in a detector to produce an audio beat-note frequency, means for measuring the field intensity of the local station, and means for measuring the intensity of the beat-note only produced by said frequency difference as a mathematical function of said field intensity of the local station.

8. A system for determining the field intensity of a distant station in the vicinity of a local station when said stations are both operating and with a frequency difference of 3 to 40 cycles, which comprises means for receiving and amplifying the carrier frequencies of both stations, means for detecting and measuring the currents resulting from such frequencies, means for calibrating said currents in terms of the combined field strength being received, and means for amplifying and measuring the intensity of the 3 to 40 cycle beat note only produced by said frequency difference.

9. A system for determining the field intensity of a distant station in the vicinity of a local station when said stations are both operating and with a frequency difference of 3 to 40 cycles, which comprises means for preventing modulation of the carrier of at least the local station below frequencies of approximately 60 cycles, means for receiving and amplifying the carrier frequencies of both stations, means for measuring the resultant combined signal of the two stations including means for rectifying and measuring the currents resulting from such frequencies, and means for amplifying and measuring the currents at audio frequencies in said rectified currents below approximately 50 cycles.

10. Apparatus for determining the field intensity of a distant station within the field of a local station operating at a slightly different frequency, which comprises a radio frequency amplifying circuit capable of being relatively sharply tuned to receive and amplify the signals from both stations, a detector circuit coupled to said amplifier for rectifying currents at said radio frequencies, means for measuring the resultant combined signal of the two stations including a meter for measuring said rectified currents, an audio frequency circuit coupled to said detector circuit for amplifying audio frequency currents therein, a low-pass filter for suppressing audio frequencies substantially above the frequency difference between the carriers of said stations, and a meter for measuring the remaining audio frequency current.

11. Apparatus for determining the field intensity of a distant station within the field of a local station operating at a slightly different frequency, which comprises a radio frequency amplifying circuit capable of being relatively sharply tuned to receive and amplify the signals from both stations, a detector circuit coupled to said amplifier including a two-electrode tube for rectifying currents at said radio frequencies, means for measuring the resultant combined signal of the two stations including a meter for measuring said rectified currents, a push-pull audio frequency circuit coupled to said detector circuit for amplifying audio frequency currents therein, a low-pass filter for preventing audio frequencies substantially above the frequency difference between the carriers of said stations from reaching said push-pull amplifier, and a meter for measuring the remaining audio frequency current.

12. A system for determining the field strengths of two stations operating simultaneously at a slight frequency difference at a point within the fields from both stations, which comprises means for receiving the signals from both stations, a rectifying circuit for detecting currents resulting from said frequencies, means for measuring the resulting unidirectional current, means for calibrating said unidirectional current in terms of the combined field strength being received at said point, an audio circuit for separating the beat note component of said unidirectional current caused by said frequency difference, and means for determining said beat note current only.

13. A system for determining the relative intensity of the interference received from a distant station in the vicinity of a local modulated station when said stations are operating with a slight frequency difference to produce an audio beat note frequency, which comprises means for the detection of the signals received from the two stations to produce an audio beat-note frequency and means for measuring only the intensity of the beat note resulting from said frequency difference in units indicating the relative interference being received.

GLENN D. GILLETT.